United States Patent
Toda et al.

(10) Patent No.: US 8,205,585 B2
(45) Date of Patent: Jun. 26, 2012

(54) VARIABLE VALVE GEAR FOR INTERNAL COMBUSTION ENGINE

(75) Inventors: Hitoshi Toda, Okazaki (JP); Masayuki Takagaki, Nukata-gun (JP); Satoshi Yoshikawa, Otsu (JP); Shinichi Murata, Okazaki (JP); Nobuaki Murakami, Kyoto (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 373 days.

(21) Appl. No.: 12/615,853

(22) Filed: Nov. 10, 2009

(65) Prior Publication Data

US 2010/0116232 A1  May 13, 2010

(30) Foreign Application Priority Data

Nov. 12, 2008 (JP) ................................ 2008-289809
Oct. 22, 2009 (JP) ................................ 2009-243396

(51) Int. Cl.
*F01L 1/34* (2006.01)

(52) U.S. Cl. ............. 123/90.16; 123/90.15; 123/90.17; 464/160

(58) Field of Classification Search ............. 123/90.15, 123/90.16, 90.17; 464/160
See application file for complete search history.

(56) References Cited

U.S. PATENT DOCUMENTS 5,622,144 A * 4/1997 Nakamura et al. ......... 123/90.15
7,168,402 B2 * 1/2007 Takemura et al. ......... 123/90.15

FOREIGN PATENT DOCUMENTS

| JP | 7-247815 A | 9/1995 |
|---|---|---|
| JP | 2000-328971 A | 11/2000 |
| JP | 2002-89304 A | 3/2002 |
| JP | 2002-256905 A | 9/2002 |
| JP | 2002-256930 A | 9/2002 |
| JP | 2002-276395 A | 9/2002 |
| JP | 2003-106176 A | 4/2003 |
| JP | 2003-307139 A | 10/2003 |
| JP | 2003-328791 A | 11/2003 |
| JP | 2006-097647 A | 4/2006 |
| JP | 2006-125346 A | 5/2006 |
| JP | 2006-348774 A | 12/2006 |
| JP | 2008-151059 A | 7/2008 |

* cited by examiner

*Primary Examiner* — Ching Chang
(74) *Attorney, Agent, or Firm* — Birch Stewart Kolasch & Birch, LLP (57) ABSTRACT

In a variable valve gear for an internal combustion engine provided with a camshaft phase change mechanism for variably controlling opening and closing timings of an intake valve, the camshaft phase change mechanism and a variable valve lift mechanism are controlled so that the closing timing of the intake valve is advanced beyond a predetermined range T1 including a bottom dead center when a load L of the internal combustion engine is less than a first predetermined value L1 and that the closing timing of the intake valve is delayed beyond the predetermined range T1 when the load L of the internal combustion engine is not less than the first predetermined value L1.

4 Claims, 6 Drawing Sheets

VARIABLE VALVE GEAR FOR INTERNAL COMBUSTION ENGINE

BACKGROUND OF THE INVENTION

1. Field of the Invention

The present invention relates to a variable valve gear for an internal combustion engine, capable of changing the lift and the opening and closing timings of an intake valve.

2. Description of the Related Art

Conventionally, a variable valve lift mechanism for changing the lifts of intake and exhaust valves and a variable valve timing mechanism for changing the opening and closing timings (phases) of the valves are known as variable valve gears for internal combustion engines. An increasing number of modern internal combustion engines are equipped with both of these mechanisms in order to further improve the fuel efficiency and output performance.

In one such internal combustion engine provided with both the variable valve lift mechanism and the variable valve timing mechanism, a negative pressure in an intake manifold and a pumping loss are generally reduced or mitigated to improve the fuel efficiency by advancing the closing timing of an intake valve during low-load operation. During high-load operation, on the other hand, the output is enhanced by increasing the lift of the intake valve and hence the intake air amount (Jpn. Pat. Appln. KOKAI Publication No. 2006-97647).

In the technique described in the above patent document, however, the closing timing of the intake valve is delayed as the lift of the valve is increased during the high-load operation. If the closing timing is delayed so that a bottom dead center is approached, the actual compression ratio becomes so high that knocking may be caused. If such knocking occurs, the fuel efficiency is reduced inevitably.

SUMMARY OF THE INVENTION

The object of the present invention is to provide a variable valve gear for an internal combustion engine provided with a variable valve timing mechanism and a variable valve lift mechanism, capable of advancing the closing timing of an intake valve to improve the fuel efficiency during low-load operation and of also improving the fuel efficiency during high-load operation.

In order to achieve the above object of the invention, there is provided a variable valve gear for an internal combustion engine for variably controlling opening and closing timings of an intake valve, the variable valve gear comprising control means for controlling opening and closing timings of the intake valve so that the closing timing of the intake valve is advanced beyond a predetermined range including a bottom dead center when a load of the internal combustion engine is less than a first predetermined value and that the closing timing of the intake valve is delayed beyond the predetermined range when the load of the internal combustion engine is not less than the first predetermined value.

Thus, if the load of the internal combustion engine is less than the first predetermined value, the closing timing of the intake valve is advanced, so that a negative pressure in the intake manifold is reduced, a pumping loss is mitigated, and hence, the fuel efficiency can be improved. If the load of the engine is not less than the first predetermined value, on the other hand, the closing timing of the intake valve is delayed beyond the predetermined range including the bottom dead center, so that the occurrence of knocking can be suppressed, and the fuel efficiency can be improved by a mirror cycle effect. Consequently, the fuel efficiency can be improved for the low- and high-load operations.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the present invention will now be described with reference to the accompanying drawings.

A first embodiment of the invention will be described first.

Figure 1:
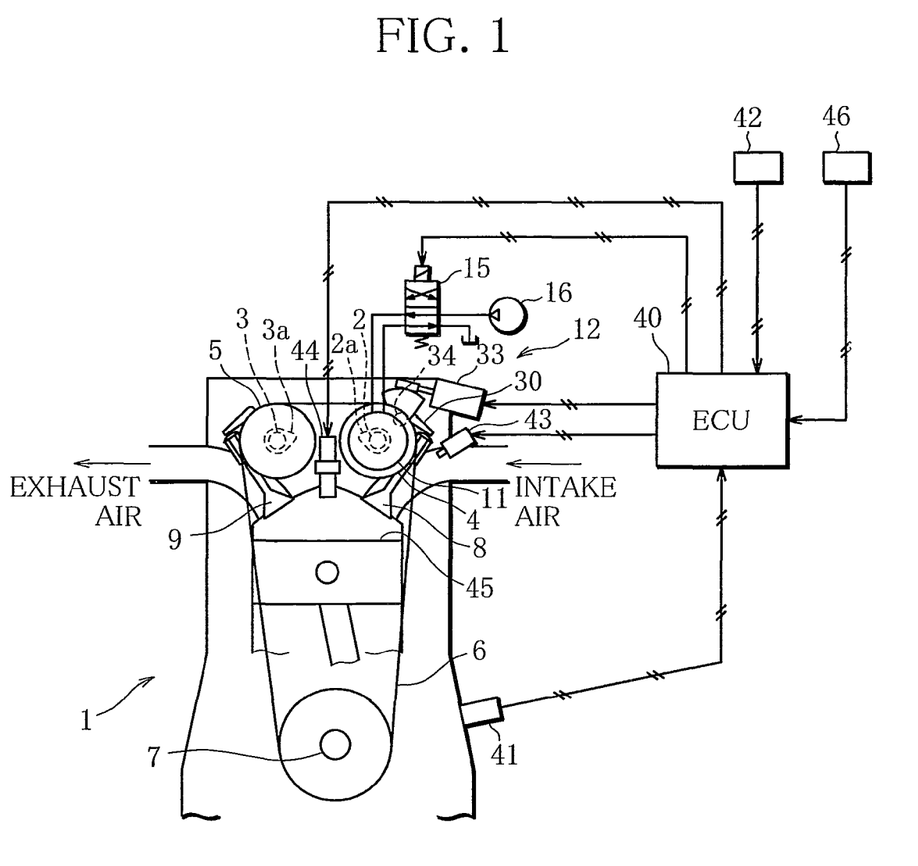
FIG. 1 is a schematic structure diagram of an engine provided with a variable valve gear according to a first embodiment of the invention.

FIG. 1 is a schematic structure diagram of an internal combustion engine (hereinafter referred to as the engine) 1 provided with a variable valve gear of the present embodiment.

The engine 1 of the present embodiment includes a DOHC valve train and is mounted as a drive source in a vehicle. Timing pulleys 4 and 5 are connected, respectively, to the respective front ends of an intake camshaft 2 and an exhaust camshaft 3 of the engine 1. The pulleys 4 and 5 are coupled to a crankshaft 7 by a timing belt 6. As the crankshaft 7 rotates, the intake and exhaust camshafts 2 and 3 are rotated together with the pulleys 4 and 5. An intake valve 8 is opened and closed by driving an intake cam 2*a* on the intake camshaft 2, and an exhaust valve 9 by an exhaust cam 3*a* on the exhaust camshaft 3.

The variable valve gear of the present embodiment is used for the valve train that drives the intake valve 8. The variable valve gear is provided with a camshaft phase change mechanism (variable valve timing mechanism) 11 and a variable valve lift mechanism 12, which will be described hereinafter.

Figure 2:
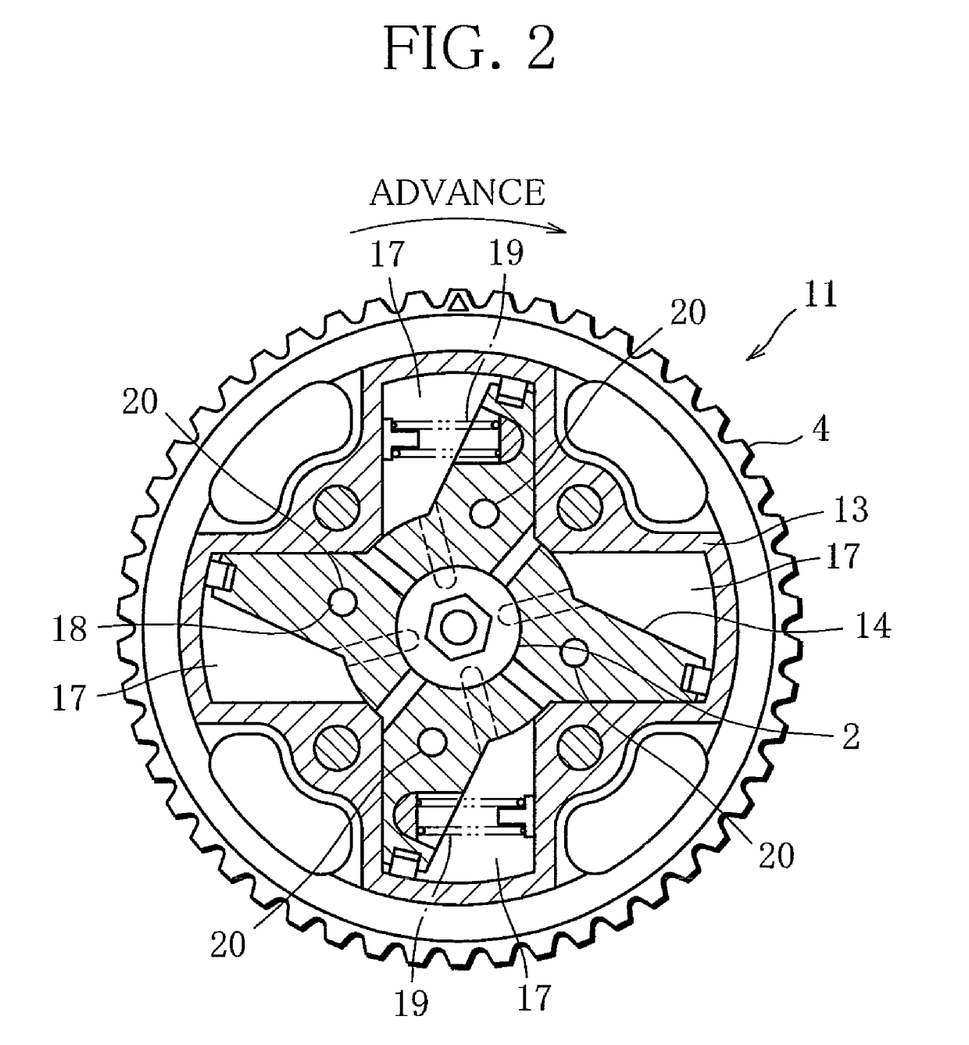
FIG. 2 is a structure view of a camshaft phase change mechanism.

FIG. 2 is an internal structure view of the camshaft phase change mechanism 11. The mechanism 11 will now be described with reference to FIGS. 1 and 2.

The camshaft phase change mechanism 11 is located between the intake camshaft 2 and the intake-side timing pulley 4. The mechanism 11 used may be a vane-type camshaft phase change mechanism, such as the one described in Jpn. Pat. Appln. KOKAI Publication No. 2000-27609 or Japanese Patent No. 3846605.

As shown in FIG. 2, the camshaft phase change mechanism 11 is constructed in such a manner that a vane rotor 14 is rotatably provided in a housing 13 in the timing pulley 4 and the intake camshaft 2 is coupled to the vane rotor 14.

An oil control valve (hereinafter referred to as the OCV) 15 is connected to the camshaft phase change mechanism 11 by an oil passage defined in the intake camshaft 2. A hydraulic fluid supplied from an oil pump 16 of the engine 1 is fed into an oil chamber 17 defined between the vane rotor 14 and the housing 13 when the OCV 15 is switched, whereby the vane rotor 14 is rotated. Thereupon, the phase angle of the intake camshaft 2 with respect to the timing pulley 4, that is, the opening and closing timings of the intake valve 8, can be adjusted continuously.

Further, the camshaft phase change mechanism 11 is provided with a locking pin 18 and a spring (urging means) 19. The locking pin 18 is configured to be inserted into any of fitting holes 20 in the vane rotor 14, thereby preventing the rotor 14 from rotating. Thus, the most advanced position of the vane rotor 14 can be set. The spring 19 is located between the housing 13 and the vane rotor 14 and serves to urge the rotor 14 in an advance direction.

Figure 3:
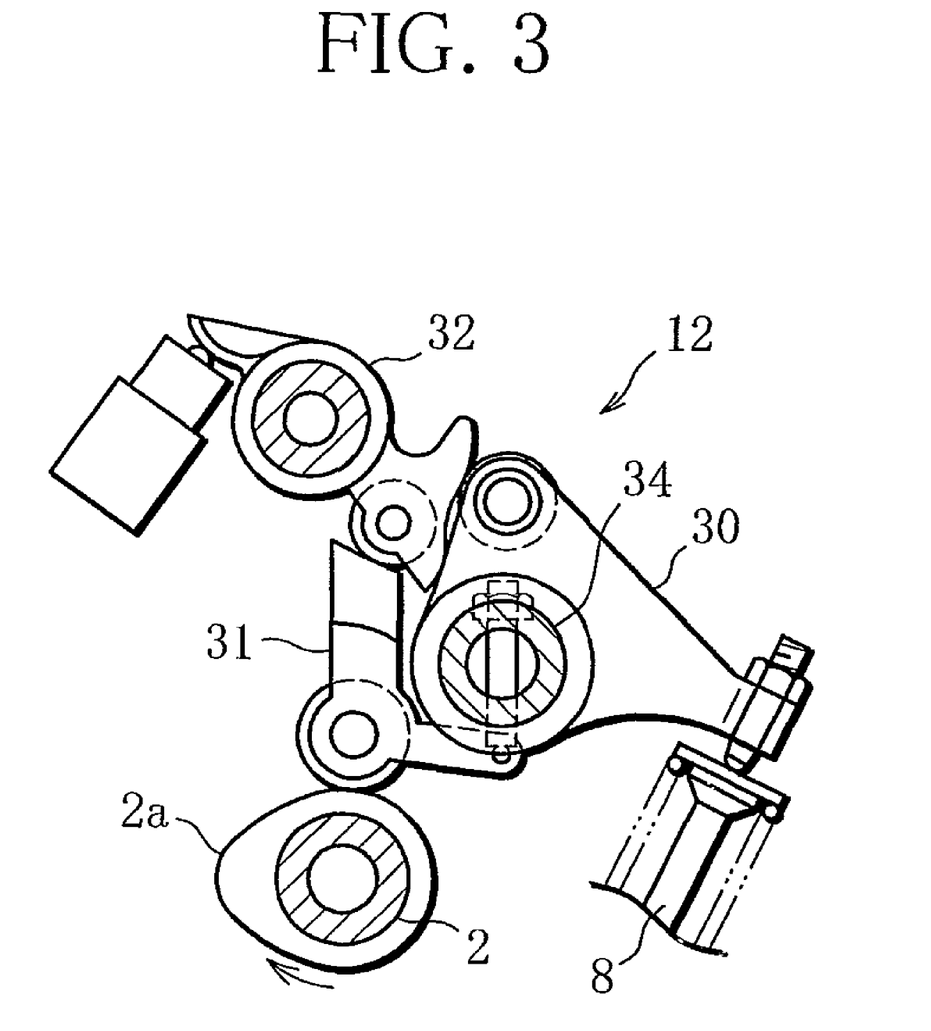
FIG. 3 is a structure view of a variable valve lift mechanism.

FIG. 3 is a schematic structure view of the variable valve lift mechanism 12. The structure of the mechanism 12 will now be described with reference to FIG. 3 in combination with FIG. 1.

The structure of the variable valve lift mechanism 12 is described in, for example, Jpn. Pat. Appln. KOKAI Publication No. 2005-299536. As shown in FIG. 3, a center rocker arm 31 and a swing cam 32 (a detailed description of which is omitted) are provided in addition to the intake camshaft 2 and a rocker arm 30 for driving the intake valve 8. In vertically moving the rocker arm 30 by rotating the intake camshaft 2, a rocker shaft 34 is pivoted by an electric motor 33 to move the pivotal position of the center rocker arm 31 so that a maximum lift of the intake valve 8 can be changed. Further, the valve-closing timing is advanced as the lift is reduced with the valve-opening timing kept substantially constant, covering the range from the maximum to a minimum. Thus, the variable valve lift mechanism 12 is a single mechanism in which the intake camshaft 2 and the rocker arm 30 are combined with the center rocker arm 31 and the swing cam 32, and which serves to basically continuously vary the lift and an open period of the intake valve 8.

An ECU 40 is provided with an input-output device (not shown), storage devices such as ROM and RAM, central processing unit (CPU), timer counter, etc., and generally controls the engine 1.

Various sensors, such as a crank angle sensor 41, throttle sensor 42, and accelerator position sensor 46, are connected to the input side of the ECU 40. The crank angle sensor 41 detects the crank angle of the engine 1. The throttle sensor 42 detects the opening of a throttle valve (not shown). The accelerator position sensor 46 detects the amount of depression of an accelerator pedal operated by a driver. Further, a fuel injection valve 43, spark plug 44, etc., as well as the OCV 15 and the electric motor 33, are connected to the output side of the ECU 40. The ECU 40 determines the ignition timing, injection quantity, etc., based on detected information from the sensors, and drivingly controls the spark plug 44 and the fuel injection valve 43. Also, the ECU 40 drivingly controls the OCV 15 and the electric motor 33, that is, the camshaft phase change mechanism 11 and the variable valve lift mechanism 12.

Figure 4:
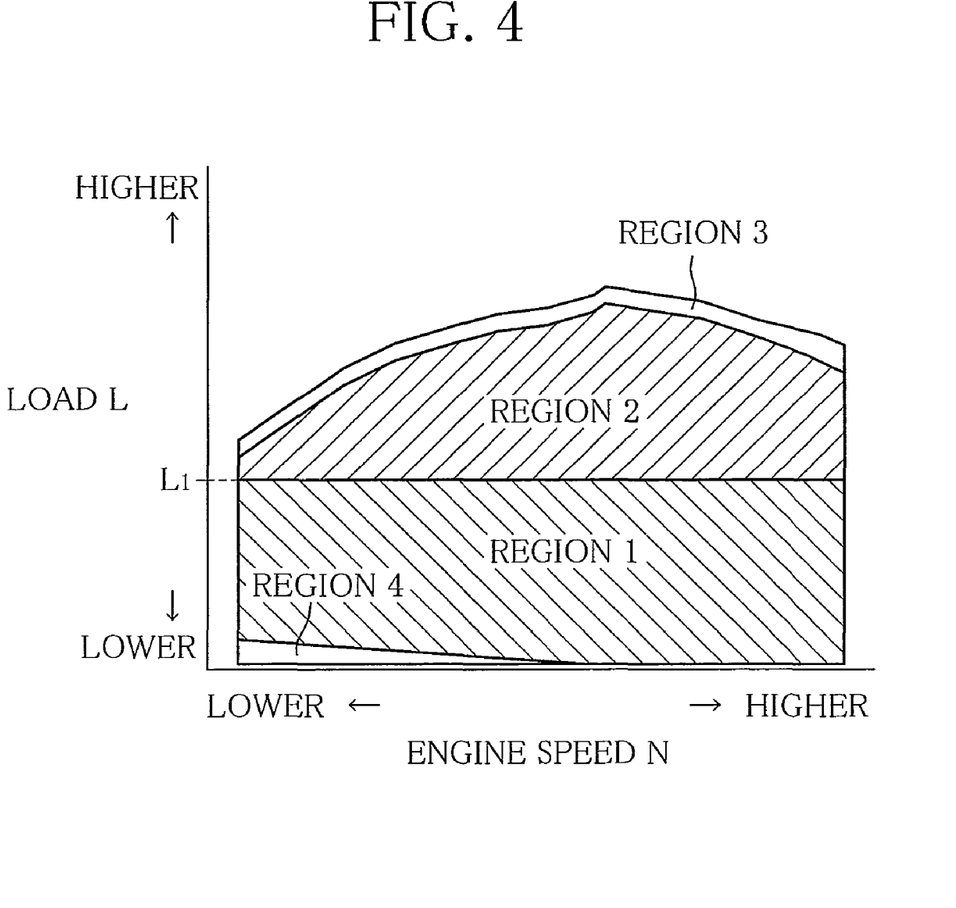
FIG. 4 is a map used in setting the camshaft phase change mechanism and the variable valve lift mechanism according to the first embodiment.

FIG. 4 is a map used in setting the camshaft phase change mechanism 11 and the variable valve lift mechanism 12 according to the first embodiment of the invention.

As shown in FIG. 4, the ECU 40 switches the variable valve lift mechanism 12 and the camshaft phase change mechanism 11, based on an engine speed N and a load L. The engine speed N should only be measured based on the transition of the crank angle detected by the crank angle sensor 41, and the load L be calculated from the amount of depression of the accelerator pedal detected by accelerator position sensor 46.

If the load L is less than a first predetermined value L1, the ECU 40 controls the camshaft phase change mechanism 11 to set the intake valve 8 to a maximum advance angle, and controls the variable valve lift mechanism 12 to set the minimum lift corresponding to the load (region 1 in FIG. 4).

If the load L is not less than the first predetermined value L1, the camshaft phase change mechanism 11 is controlled and set to a maximum delay angle, and the lift is set to the maximum by the variable valve lift mechanism 12 (region 2 in FIG. 4).

If the load L is in a maximum region, or more specifically, if an accelerator is fully open, the camshaft phase change mechanism 11 and the variable valve lift mechanism 12 are controlled so that the output of the engine 1 is maximized. In the engine 1 of the present embodiment, the output is maximized by slightly advancing the valve-closing timing ahead of the maximum delay angle and making the lift somewhat less than the maximum (region 3 in FIG. 4).

If the load L is in a minimum region, or more specifically, if the accelerator is fully closed as in an idle or deceleration mode, the variable valve lift mechanism 12 is controlled so that the minimum lift is exceeded with the camshaft phase change mechanism 11 kept at the maximum advance angle.

Figure 5:
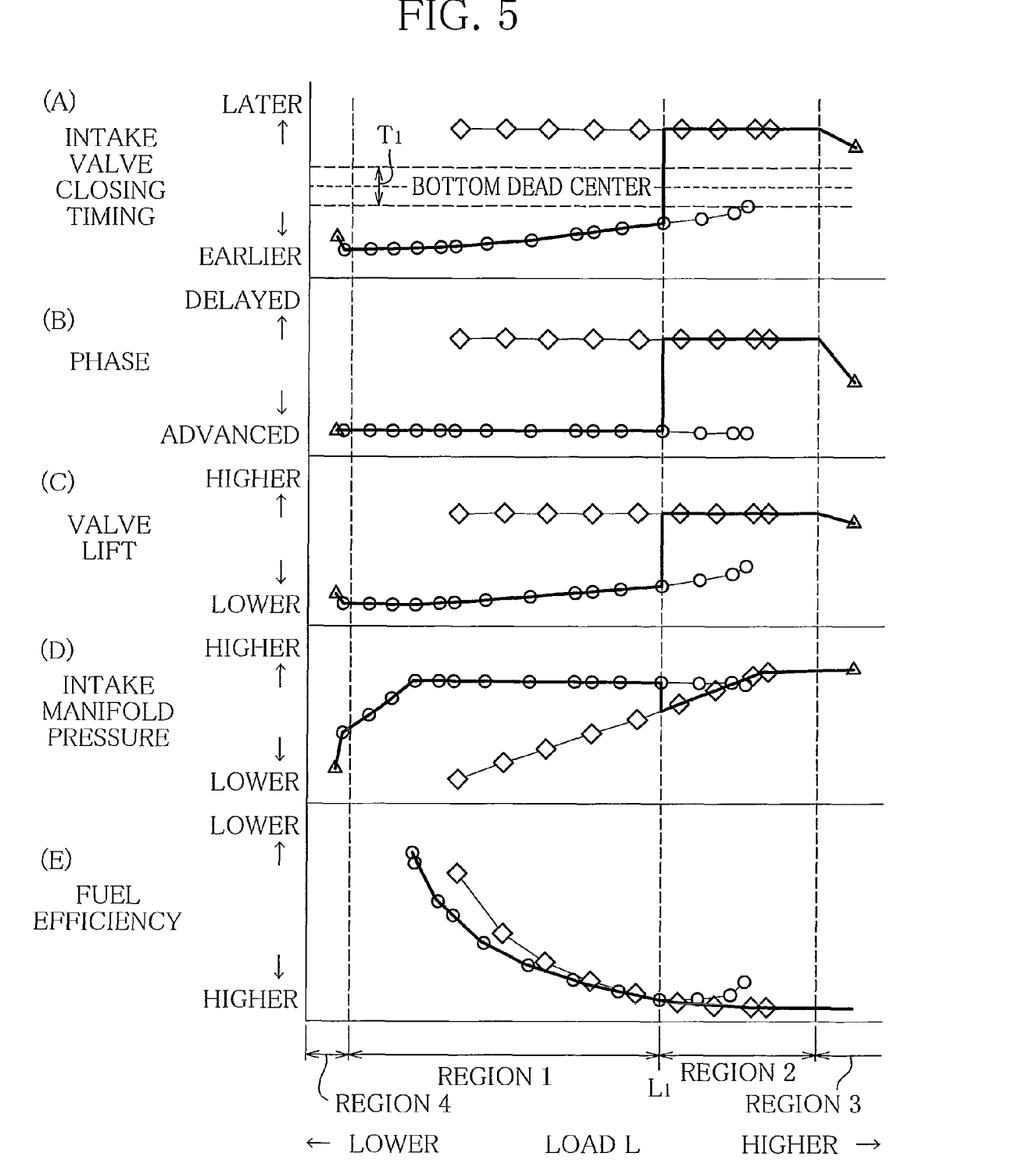
FIG. 5 is a graph showing set states of the camshaft phase change mechanism and the variable valve lift mechanism and an engine state corresponding to a load.

FIG. 5 is a graph showing set states of the variable valve lift mechanism 12 and the camshaft phase change mechanism 11 and an engine state corresponding to the load. In FIG. 5, (A) represents the closing timing of the intake valve 8; (B), phase of the valve 8 variably controlled by the camshaft phase change mechanism 11; (C), lift of the valve 8 variably controlled by the variable valve lift mechanism 12; (D), pressure in an intake manifold; and (E), fuel efficiency. All these values individually correspond to the load of the engine 1. In FIG. 5, circles (○) indicate values for cases where the closing timing of the intake valve 8 is the earliest, while rhombuses (◇) indicate values for cases where the closing timing of the valve 8 is the latest.

In the region 1 where the load L is less than the first predetermined value L1, as shown in FIG. 5, the closing timing of the intake valve 8 is advanced, so that a negative pressure in the intake manifold can be reduced (or pressure can be increased). Thus, a pumping loss can be mitigated, so that the fuel efficiency can be improved.

In the region 2 where the load L is not less than the first predetermined value L1, the camshaft phase change mechanism 11 is subjected to maximum delay angle control, and the lift is set to the maximum by the variable valve lift mechanism 12, whereby the closing timing of the intake valve 8 is most delayed. Thus, the closing timing of the valve 8 can be delayed beyond a predetermined range T1 including a bottom dead center, so that the occurrence of knocking can be suppressed, and the fuel efficiency can be improved by a mirror cycle effect.

In the region 3 where the accelerator is fully open, the closing timing of the intake valve 8 is advanced ahead of the maximum delay angle, and the lift is made less than the maximum, whereby the output performance of the engine 1 is maximally displayed.

In the region 4 where the accelerator is fully closed, the valve lift is set to be a little more than the minimum, whereby the pressure in the intake manifold can be reduced to secure a sufficient negative pressure for a brake master back.

Thus, in the engine provided with both the camshaft phase change mechanism 11 and the variable valve lift mechanism 12 according to the present embodiment, the pumping loss is mitigated by reducing the pressure in the intake manifold in a low-load region. In a high-load region, on the other hand, the closing timing of the intake valve 8 is delayed beyond a point near the bottom dead center, so that the occurrence of knocking can be suppressed, and the fuel efficiency can be improved by a mirror cycle effect. The fuel consumption performance can be improved throughout the area from the low-load region to the high-load region.

Furthermore, the closing timing of the intake valve 8 is controlled by both the camshaft phase change mechanism 11 and the variable valve lift mechanism 12, so that the closing timing of the intake valve 8 is advanced or delayed beyond the predetermined range T1 including the bottom dead center smoothly. Consequently, time when the closing timing of the intake valve 8 is in the predetermined range T1 including the bottom dead center at a transition period of switching control is reduced. Besides, the camshaft phase change mechanism 11 is operated by oil pressure and the variable valve lift mechanism 12 is operated by electric force differently, so that bad movement and the like caused by deficiency of oil pressure or deficiency of electric force in case the camshaft phase change mechanism 11 and the variable valve lift mechanism 12 are operated by the same driving force, can be reduced.

Since the variable valve lift mechanism 12 is powered by electric force, moreover, it can be accurately actuated even if the oil temperature is as low as in the case of a cold start or if the oil pressure is not sufficiently increased on account of the low-speed operation. Thus, the fuel efficiency for low-temperature, low-speed operation can be improved.

Since the lift of the valve depends greatly on an air amount, furthermore, the variable valve lift mechanism 12 is required to keep a very high variable response, thus requiring electrification.

If the load is in a minimum region, such as the one where the accelerator is fully closed, moreover, the reduction of the negative pressure in the intake manifold is mitigated to secure a sufficient negative pressure for the brake master back. Thus, a negative-pressure pump need not be used to secure the negative pressure for the brake master back, so that an increase in parts cost can be suppressed.

If the load is in a minimum region, such as the one where the accelerator is fully open, a minimum output of the engine 1 can be obtained by advancing the closing timing of the intake valve 8 ahead of the maximum delay angle and making the lift somewhat less than the maximum, not by adjusting these values to the maximums. Thus, the engine performance can be maximally displayed as required, so that the acceleration performance of the vehicle can be improved.

An overlap should be provided such that both the intake and exhaust valves 8 and 9 are opened even when the intake valve 8 is subjected to maximum delay angle control in the high-load region. If this is done, the pumping loss is mitigated in an initial stage of an intake stroke, so that the fuel efficiency can be further improved.

The following is a description of a second embodiment of the present invention.

Figure 6:
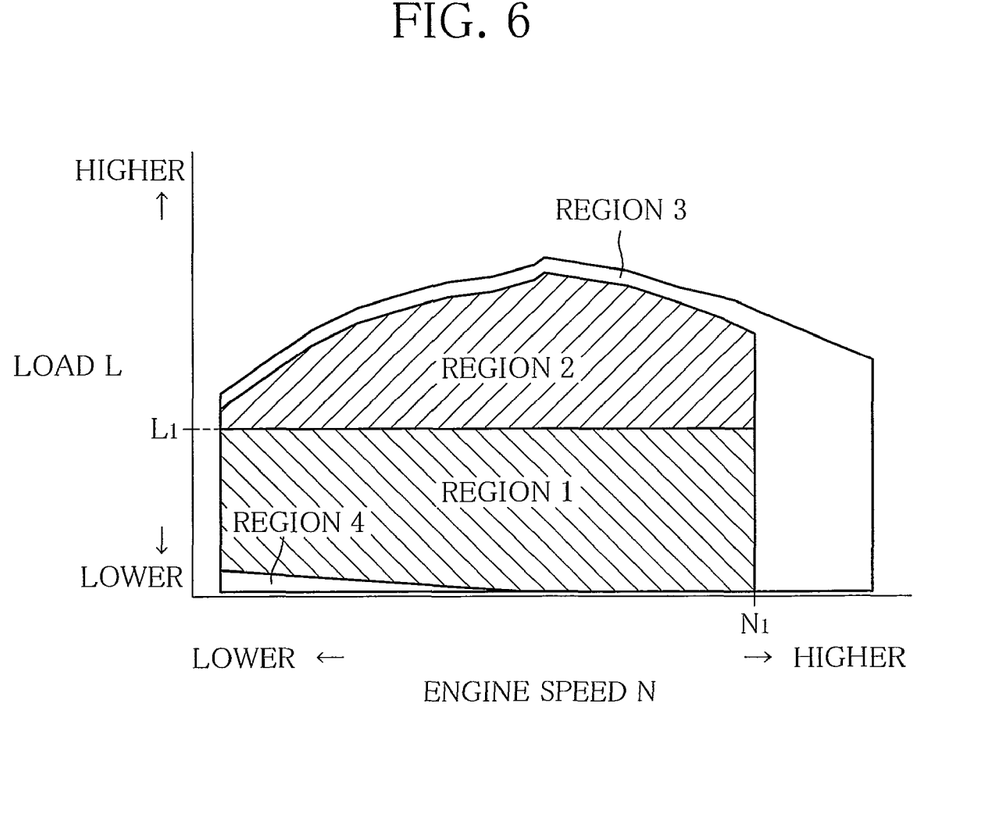
FIG. 6 is a map used in setting a camshaft phase change mechanism and a variable valve lift mechanism according to a second embodiment.

FIG. 6 is a map used in setting a camshaft phase change mechanism 11 and a variable valve lift mechanism 12 according to the second embodiment of the invention.

In the second embodiment, the camshaft phase change mechanism 11 and the variable valve lift mechanism 12 are switched based on the engine speed N as well as on the load, as in the first embodiment.

More specifically, if the engine speed N is less than a second predetermined value N1, the control in any of the regions 1 to 4 is selected based on the load, as in the first embodiment. If the engine speed N is not less than the second predetermined value N1, according to the present embodiment, the camshaft phase change mechanism 11 and the variable valve lift mechanism 12 are controlled so that the output performance of the engine can be maximally displayed, as in the region 3, without regard to the load.

Thus, in the second embodiment, the camshaft phase change mechanism 11 and the variable valve lift mechanism 12 are not subjected to switching control depending on the load in a high-rotation mode such that the actual fuel efficiency is affected little, so that the durability of the mechanisms 11 and 12 can be improved.

According to the present embodiment, the invention is applied to the engine that is provided with both the camshaft phase change mechanism 11 and the variable valve lift mechanism 12. However, the invention is not limited to this embodiment, and may also be applied to an engine that has a function to variably control the closing timing of the intake valve 8. In this case, at least the fuel efficiency in the high-load region can be improved by delaying the closing timing of the intake valve 8 beyond the predetermined range T1 including the bottom dead center if the load L is not less than the first predetermined value L1.

What is claimed is:

1. A variable valve gear for an internal combustion engine for variably controlling opening and closing timings of an intake valve, the variable valve gear comprising:
   a variable valve timing mechanism which variably controls the opening and closing timings of the intake valve by changing a phase between a crankshaft of the internal combustion engine and an intake camshaft;
   a variable valve lift mechanism which increases a lift of the intake valve while delaying the closing timing of the intake valve at least,
   control means for controlling opening and closing timings of the intake valve so that the closing timing of the intake valve is advanced beyond a predetermined range including a bottom dead center when a load of the internal combustion engine is less than a first predetermined value and that the closing timing of the intake valve is delayed beyond the predetermined range when the load of the internal combustion engine is not less than the first predetermined value; by controlling the variable valve lift mechanism together with the variable valve timing mechanism,
   wherein the control means controls the variable valve timing mechanism so that the closing timing of the intake valve is most advanced and also controls the variable valve lift mechanism based on the load of the internal combustion engine when the load of the internal combustion engine is less than the first predetermined value, and
   the control means controls the variable valve timing mechanism so that the closing timing of the intake valve is most delayed and also controls the variable valve mechanism so that the lift of the intake valve is maximum when the load of the internal combustion engine is not less than the first predetermined value.

2. The variable valve gear for an internal combustion engine according to claim 1, wherein the control means controls the variable valve timing mechanism and the variable valve lift mechanism so that the closing timing of the intake valve is advanced beyond a maximum delay angle and the lift of the intake valve is reduced below the maximum when an accelerator of the internal combustion engine is fully open.

3. The variable valve gear for an internal combustion engine according to claim 1, wherein the control means controls the variable valve lift mechanism so that the lift of the intake valve is more than a minimum when an accelerator of the internal combustion engine is fully closed.

4. The variable valve gear for an internal combustion engine according to claim 1, wherein the control means controls the variable valve timing mechanism and the variable valve lift mechanism so that the closing timing of the intake valve is advanced beyond a maximum delay angle and the lift of the intake valve is reduced below the maximum without regard to the load of the internal combustion engine when a rotational speed of the internal combustion engine is not less than a second predetermined value.

* * * * *